Nov. 1, 1949.  C. H. JOLLY  2,486,418

AUTOMATICALLY SELF-RELEASING AIRCRAFT LANDING HOOK

Filed April 28, 1943

INVENTOR
Carl H. Jolly
BY
ATTORNEY

Patented Nov. 1, 1949

2,486,418

UNITED STATES PATENT OFFICE 2,486,418

AUTOMATICALLY SELF-RELEASING AIRCRAFT LANDING HOOK

Carl H. Jolly, United States Navy

Application April 28, 1943, Serial No. 484,851

6 Claims. (Cl. 244—110)

(Granted under the act of March 3, 1883, as amended April 30, 1928; 370 O. G. 757)

This invention relates broadly to improvements in landing or arresting hooks for aircraft, and more particularly to means in the arresting hook for accomplishing the quick and automatic release of the arresting hook of an aircraft after the same has landed and engaged the transverse retarding cable upon a restricted landing area so equipped and which will release the aircraft while it is still moving, but after its movement has been reduced to a certain predetermined maximum speed.

The primary object of this invention is to provide an aircraft landing equipment with an automatically self-releasing mechanism for disengaging the transverse retarding cable from the arresting hook after the speed of the aircraft has been reduced from substantially landing speed to substantially taxiing speed, thus enabling the aircraft to immediately continue at a taxiing speed to its parking area from the landing area without the necessity of coming to a full stop and then being backed up on the landing area, thus making the landing area more quickly available to a succeeding aircraft for landing purposes.

Still a further object of this invention is to provide an automatically self-releasing landing hook which also includes an automatic resetting mechanism operated by the mere retardation of the landing hook in the aircraft carrying position.

With the foregoing and other objects in view, the invention consists in the construction, combination and arrangement of parts hereinafter described and illustrated in the drawings, in which.

Figure 1:
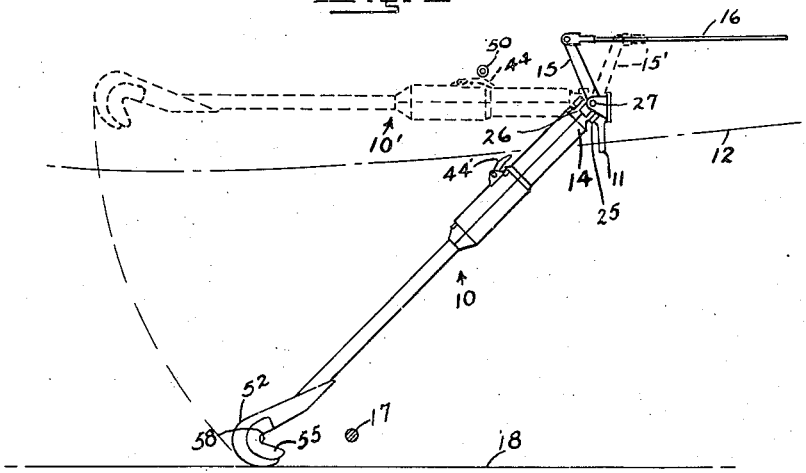
Fig. 1 is an elevational view of the landing hook of this invention, showing the hook in dash outline in carrying position and in full outline in landing position.

There is shown at 10 the landing or arresting hook of this invention which is pivoted to a bracket 11 firmly attached to an aircraft through the bottom of the fuselage shown in outline at 12. Secured to the pivoted end 14 of the hook 10 by means of pivot 25 is a bell crank lever 15 to which is pivoted control member 16 for operation by the pilot of the aircraft for moving the bell crank lever 15 from the position shown in dash outline at 15' to that shown in full outline at 15, thus simultaneously pivoting the hook 10 from the carrying position shown in dash outline 10' to the landing position shown in full outline at 10. When in a landing position this landing hook 10 cooperates with a transverse retarding cable, one or more of which is stretched across a restricted landing area 18 which may be the deck of an aircraft carrier or other similar restricted area. Normally, when the hook 10 catches on the transverse retarding cable 17 it cannot be released therefrom until after the aircraft has come to a complete stop and then is backed up some ten or twenty feet by the landing area personnel until the tension on the transverse cable 17 is sufficiently released to enable the hook 10 to be disengaged therefrom.

With this invention, however, such a complete stop and backing up of the aircraft becomes unnecessary, and instead the hook 10 of this invention hooks onto the retarding cable 17 and stays in engagement therewith until the aircraft has reduced its speed from a landing speed to a taxiing speed of approximately five miles an hour, whereupon it automatically releases itself from the retarding cable 17, permitting the aircraft to taxi onward to the side of the landing area without any delay, enabling the landing area to be more quickly available to a succeeding aircraft about to land.

The landing hook 10 includes a two-part housing 20 consisting of an upper member 21 and a lower member 22, secured together by six bolts 23. The housing 20 is provided at its end with a pair of extending aligned ears 24 for cooperation with a vertical pivot 25 which, in turn, is connected by a universal joint member 26 to a transverse pivot 27 which connects it to the aircraft bracket 11. This universal joint member 26 forms a part of bell crank lever 15, thus permitting the controlled movement of the hook 10 between the landing position at 10 to the carrying position at 10'.

Located within this housing 20 is a pair of yieldable members, here shown as being in the form of compressible coiled springs 28 and 30, each located in aligned but separated cavities 31 and 32 formed within the housing 20 by means of a webbing 33. It is to be noted that the spring 28 is somewhat greater than the spring 30, as a result of which when both springs have been deflected an equal amount, the spring 28 will be under greater strain than the spring 30.

Extending through the webbing 33 of the housing 20 is a connecting rod 34 to the end 35 of which, within cavity 31, is welded a base member 36 for compressing the spring 28 against the webbing 33 as the connecting rod 34 is moved to the left when the hook 10 engages the retarding cable 17.

Concentrically extending about the rod 34 is a tube 37 whose end 38 is internally threaded for cooperative engagement with a threaded hollow cylindrical extension 40 of a base member 41 located within the cavity 32, thus serving to compress the spring 30 against the front wall 42 of cavity 32 as the tube 37 is simultaneously placed under strain when the hook 10 engages the retarding cable 17. The back of the base member 41 is provided with a circumferential groove 43 adapted to be engaged by a notched latch member 44 whose pawl end 45 extends through a slot 46 in the upper housing member 21. This latch member 44 is pivoted between a pair of upstanding ears 47 on opposite sides of the slot 46 and a small compression spring 48 normally urges the latch member 44 to the position shown in dash outline at 44'.

As will be apparent, the base member 41 may move forwardly under tension of the tube 37, cocking the latch 44 by permitting the base member 41 to pass beyond the pawl end 45 but preventing its return so long as the latch 44 is held in the position 44' by the spring 48, thus holding the base member 41 in the dash position shown at 41'. However, when the pilot operates the control 16 to restore the hook 10 from its landing position to the carrying position at 10', a roller member 50 on the aircraft is so located that it abuts the top of the latch member 44 and moves it from the position 44' to the position 44, thus releasing the pawl 45 from the circumferential groove 43 in the back of base member 41. This permits the spring 30 to expand and restore the base member 41 and the tube 37 to the position shown in full lines in Fig. 4. Although the strength and dimensions of the springs 28 and 30 may be varied according to the requirements of a particular aircraft, in one size, the spring 28 is of such strength that it will exert 1600 pounds of force when it is compressed one and one-half inches, while the spring 30 will exert but 1200 pounds of force under the same one and one-half inches of compression, this one and one-half inches being the amount that the base member 41 is held by the latch 44 away from the webbing 33.

Figure 2:
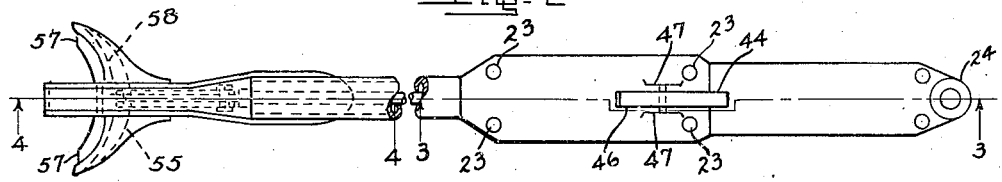
Fig. 2 is a top plan view of the hook of this invention on a larger scale, partly broken away.
Figure 3:
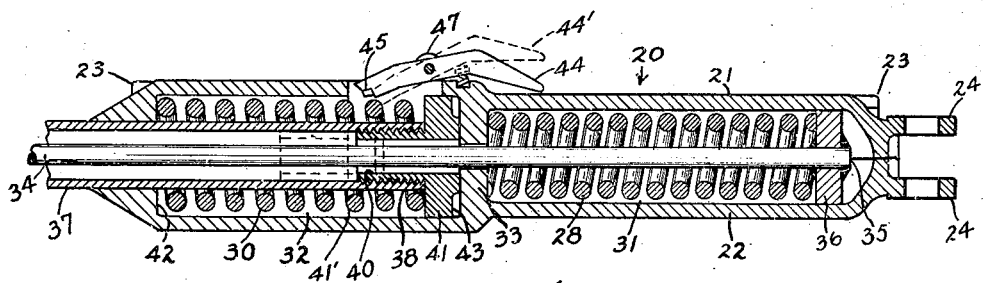
Fig. 3 is a sectional view on line 3—3 of Fig. 2, on an enlarged scale.
Figure 4:
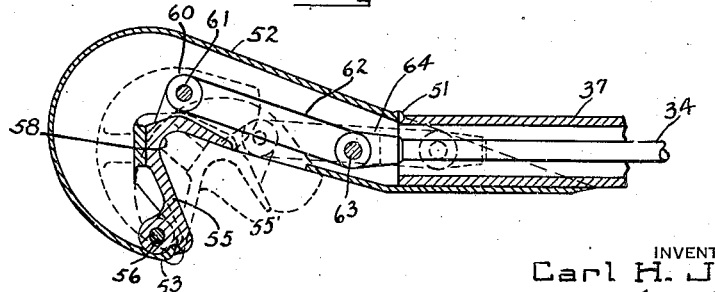
Fig. 4 is a sectional view on line 4—4 of Fig. 2, on an enlarged scale.

Secured to the other end of the tube 37, as by welding 51, is a hook head 52 of substantial strength but hollow, as shown in Fig. 4. Pivoted within the tip 53 of the hook head 54 is a hook throat 55, the pivoting member being shown at 56. As will be observed in Fig. 2, this hook throat 55 extends in curved wings 57 on opposite sides of the hook head 52, thus providing a transversely curved cable-engaging surface 58. In cable-engaging position the hook throat 55 remains in the full line position shown in cross-section in Fig. 4. Extending from the side of the hook throat 55 opposite the pivoted member 56 is a pair of ears 60 within the hollow hook head 52. A pivot 61 connects the ears 60 to a link 62, which in turn is secured by a pivot 63 to an ear member 64, threaded or otherwise secured to the end of connecting rod 34 within the tube 37 and hook head 52.

In operation, when the pilot of the aircraft approaches the landing area 18, he operates his control 16 to drop the arresting hook from the carrying position 10' to the landing position 10. The hook throat on throwout lever 55 is cocked when latch 44 moves from the position 44 to the position 44' so that its pawl end 45 may catch against the back of spring base member 41 whenever it travels therebeyond. When the aircraft travels along the landing area 18 with the hook 10 in landing position as shown, the first transverse retarding cable 17 will engage within the hook throat 55 and lie against the transverse curve 58. As the retarding force is transmitted by the hook 10 to the aircraft, the connecting rod 34 and cylindrical tube 37 will telescope simultaneously against the action of the springs 28 and 30 within the housing 29, thus cushioning the shock of the engagement and simultaneously moving the base member 41 to beyond the pawl end 45 of latch 44.

As the aircraft slows down, the springs 28 and 30 will tend to simultaneously retract the hook head 52 and hook throat 55. However, when the base member 41 is engaged by the pawl end 45, the latch 44 will limit the retraction of the hook head 52 while the stronger spring 28 will tend to retract its base member 36 and the connecting rod 34 the full amount. The strength of these springs is such that this full retraction will take place when the speed of the aircraft has been reduced to a desired taxiing speed of about five miles an hour. As the connecting rod 34 is thus retracted while the hook tube 37 is held against movement, the effect is that the connecting rod 34 acting through the link 62 pivots the hook throat 55 to the position shown in dash outline at 55', thereby disengaging the retarding cable 17 therefrom and releasing the aircraft so that it may continue at a taxiing speed to a desired parking location.

The latch 44 meantime remains in the position 44', preventing engagement of the landing hook with any further retarding cables 17, although the pilot may, as soon as he feels that his aircraft has been released from the retarding force, operate his control 16 to restore the hook 10 to the carrying position 10'. As soon as the hook 10 is restored to the carrying position 10', the latch 44 contacts the aircraft carried roller 50 to move the latch 44 from position 44' to position 44, thus releasing the base member 41 and permitting the spring 30 to retract the hook head 52, thus resetting the landing hook immediately for the next landing operation.

Other modifications and changes in the number and proportions of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. An automatically self-releasing aircraft arresting hook for cooperation with a transverse retarding cable, means carried by said hook for ejecting said transverse cable from said hook when tension on said hook is diminished to a predetermined amount, said means including a hook head, a hook throat pivoted in said hook head, a pair of yieldable means placeable under strain by the cooperation of said hook with said retarding cable, means connecting one of said yieldable means to said hook head, means connecting the other of said yieldable means to said hook throat, a housing in which both said yieldable means are based, and means temporarily holding one of said yieldable means under strain while the tension in said hook is diminishing while the other of said yieldable means is released from strain by the diminishing tension to actuate the connecting means and pivot said hook throat relative to said hook head, and thereby eject the retarding cable from the hook.

2. An automatically self-releasing aircraft arresting hook for cooperation with a transverse retarding cable, means carried by said hook for ejecting said transverse cable from said hook when tension on said hook is diminished to a predetermined amount, said means including a hook head, a hook throat pivoted in said hook head, a pair of yieldable means placeable under strain by the cooperation of said hook with said retarding cable, means connecting one of said yieldable means to said hook head, means connecting the other of said yieldable means to said hook throat, a housing in which both said yieldable means are based, means temporarily holding one of said yieldable means under strain while the tension in said hook is diminishing while the other of said yieldable means is released from strain by the diminishing tension to actuate the connecting means and pivot said hook throat relative to said hook head, and thereby eject the retarding cable from the hook, and cooperating means on the aircraft adapted to release said temporary holding means from holding position when the landing hook is moved to the stowage position on the aircraft.

3. An automatically self-releasing aircraft arresting hook mounted on an aircraft for use in an aircraft arresting position extending below the aircraft, comprising a shock absorbing means, a hook member adapted to cooperate with a transverse retarding cable when in aircraft arresting position and thereby place the shock absorbing means under strain, and means actuated by said shock absorbing means as the strain thereon is thereafter reduced to cause said hook member to release itself from said transverse retarding cable.

4. An automatically self-releasing aircraft arresting hook mounted on aircraft for use in an aircraft arresting position extending below the aircraft, comprising a shock absorbing means, a hook member adapted to cooperate with a transverse retarding cable when in aircraft arresting position and thereby place the shock absorbing means under strain, means actuated by said shock absorbing means as the strain thereon is thereafter reduced to cause said hook member to release itself from said transverse retarding cable, said hook member including a pivoted cable-ejecting member and means connecting said cable-ejecting member to said shock absorbing means to actuate said cable-ejecting member as the strain on said shock absorbing means diminishes.

5. An automatically self-releasing aircraft arresting hook mounted on an aircraft for use in an aircraft arresting position extending below the aircraft, comprising a shock absorbing means, a hook member adapted to cooperate with a transverse retarding cable when in aircraft arresting position and thereby place the shock absorbing means under strain, means actuated by said shock absorbing means as the strain thereon is thereafter reduced to cause said hook member to release itself from said transverse retarding cable, said hook member including a pivoted cable-ejecting member and means connecting said cable-ejecting member to said shock absorbing means to actuate said cable-ejecting member as the strain on said shock absorbing means diminishes, said shock absorbing means including a pair of springs, one of said springs being based against said connecting means and the other of said springs cooperating with said hook member, and latch means for temporarily holding one of said springs under strain as the tension thereon is diminished to permit the other of said springs to retract said connecting means and thereby cause the movement of said cable-ejecting member.

6. An automatically self-releasing aircraft arresting hook mounted on an aircraft for use in an aircraft arresting position extending below the aircraft, comprising a shock absorbing means, a hook member adapted to cooperate with a transverse retarding cable when in aircraft arresting position and thereby place the shock absorbing means under strain, means actuated by said shock absorbing means as the strain thereon is thereafter reduced to cause said hook member to release itself from said transverse retarding cable, said hook member including a pivoted cable-ejecting member and means connecting said cable-ejecting member to said shock absorbing means to actuate said cable-ejecting member as the strain on said shock absorbing means diminishes, said shock absorbing means including a pair of springs, one of said springs being based against said connecting means and the other of said springs cooperating with said hook member, latch means for temporarily holding one of said springs under strain as the tension thereon is diminished to permit the other of said springs to retract said connecting means and thereby cause the movement of said cable-ejecting member, and means on said aircraft cooperating with said latch means to unlatch the same when the landing hook is moved to stowage position and thereby to prepare the landing hook for operation when next moved to landing position.

CARL H. JOLLY.

REFERENCES CITED

The following references are of record in the file of this patent:

UNITED STATES PATENTS

| Number | Name | Date |
|---|---|---|
| 398,060 | Lewellen | Feb. 19, 1889 |
| 722,721 | Lamb | Mar. 17, 1903 |
| 1,026,469 | Senacol | May 14, 1912 |
| 1,845,466 | Williams | Feb. 16, 1932 |
| 1,994,646 | Heath | Mar. 16, 1935 |
| 2,276,312 | Jurschick | Mar. 17, 1942 |

FOREIGN PATENTS

| Number | Country | Date |
|---|---|---|
| 22,404 | Great Britain | 1912 |
| 99,113 | Switzerland | Jan. 13, 1922 |